(12) United States Patent
Sakai et al.

(10) Patent No.: US 10,994,355 B2
(45) Date of Patent: May 4, 2021

(54) METAL LAMINATING AND MOLDING METHOD

(71) Applicant: MITSUBISHI HEAVY INDUSTRIES COMPRESSOR CORPORATION, Tokyo (JP)

(72) Inventors: Yasunori Sakai, Hiroshima (JP); Kosei Kawahara, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 225 days.

(21) Appl. No.: 16/139,157

(22) Filed: Sep. 24, 2018

(65) Prior Publication Data

US 2019/0134732 A1 May 9, 2019

(30) Foreign Application Priority Data

Nov. 6, 2017 (JP) .............................. JP2017-213481

(51) Int. Cl.
*B23K 9/04* (2006.01)
*B33Y 40/00* (2020.01)
*B33Y 10/00* (2015.01)

(52) U.S. Cl.
CPC .............. *B23K 9/044* (2013.01); *B33Y 10/00* (2014.12); *B33Y 40/00* (2014.12)

(58) Field of Classification Search
CPC ........ B23K 9/044; B23K 9/046; B23K 9/048; B23K 9/042; B23K 20/1215; B23K 15/0086; B23K 10/027; B23K 11/0013; B23K 26/342; B23K 5/18; B23K 25/0005; B23K 25/005; B23K 9/04; B23K 23/342; Y10T 29/49746; Y10T 29/49316; Y10T 29/49325; Y10T 29/49336; Y10T 29/49732; Y10T 29/79734; Y10T 29/79737
USPC .............. 228/103, 104, 155, 159, 160, 162; 219/54, 76.1, 76.11, 76.12, 76.13, 76.15, 219/76.16
See application file for complete search history.

(56) References Cited

U.S. PATENT DOCUMENTS 4,234,119 A * 11/1980 Masaoka .............. B23K 9/0216
219/137 R
4,864,094 A * 9/1989 Saltzman ................. B23K 9/04
219/77

(Continued)

FOREIGN PATENT DOCUMENTS

JP 3784539 B2 6/2006

*Primary Examiner* — Jason L Vaughan
(74) *Attorney, Agent, or Firm* — Osha Bergman Watanabe & Burton LLP

(57) ABSTRACT

A metal laminating and molding method molds a 3-dimensional molded object formed by sequentially laminating a plurality of metal layers. The metal laminating and molding method is accomplished by repeatedly performing a unit process including a metal layer laminating process of laminating the metal layer constituted by welding beads formed through arc welding and a removal process of removing impurities from a surface of the metal layer laminated in the metal layer laminating process. When the unit process is repeated, the metal layer laminating process is performed again such that a new metal layer is laminated on the surface of the metal layer from which impurities have been removed in the removal process.

7 Claims, 2 Drawing Sheets

(56) References Cited

U.S. PATENT DOCUMENTS

| | | | | |
|---|---|---|---|---|
| 7,472,478 B2* | 1/2009 | Graham | .................. | B23P 6/007 |
| | | | | 29/888 |
| 7,741,578 B2* | 6/2010 | Adams | .................. | B22F 3/1055 |
| | | | | 219/121.36 |
| 8,257,049 B2* | 9/2012 | Yelistratov | ............... | B23P 6/007 |
| | | | | 416/241 R |
| 8,367,962 B2* | 2/2013 | Zaffino | .................. | B23K 9/044 |
| | | | | 219/76.1 |
| 9,174,293 B2* | 11/2015 | Meyer | .................... | B23K 9/042 |
| 9,855,627 B2* | 1/2018 | Wada | ........................ | B23P 6/00 |
| 10,427,247 B2* | 10/2019 | Wescott | ............... | B23K 26/356 |
| 2006/0168808 A1* | 8/2006 | Lin | ...................... | B23K 10/027 |
| | | | | 29/889.1 |
| 2007/0111119 A1* | 5/2007 | Hu | ......................... | C22C 38/18 |
| | | | | 430/57.8 |
| 2009/0014421 A1* | 1/2009 | Sathian | .................. | B23K 9/044 |
| | | | | 219/75 |
| 2010/0008816 A1* | 1/2010 | Hu | ......................... | B23K 26/34 |
| | | | | 420/445 |
| 2013/0167349 A1* | 7/2013 | Wada | ...................... | B23P 23/04 |
| | | | | 29/402.18 |
| 2013/0244052 A1* | 9/2013 | Mullock | ............... | B23K 5/006 |
| | | | | 428/622 |
| 2017/0144242 A1* | 5/2017 | McQueen | ................ | B22F 3/24 |

* cited by examiner

METAL LAMINATING AND MOLDING METHOD

CROSS-REFERENCE TO RELATED APPLICATION

Priority is claimed on Japanese Patent Application No. 2017-213481, filed Nov. 6, 2017, the content of which is incorporated herein by reference.

BACKGROUND

Field

The present disclosure relates to a metal laminating and molding method.

Description of Related Art

In recent years, as one of so-called 3D printer (3D modeling) technologies, a technology of laminating and molding a metal has been developed and practically applied. In such a metal laminating and molding method, there is a metal powder sintering method of melting and fixing metal powders through laser radiation. In recent times, focusing on a technology of melting and fixing metals through arc discharge used in arc welding, a molten metal laminating method of performing 3D modeling by laminating molten metals has also been developed.

For example, Patent Document 1 discloses a method of manufacturing a mold configured to mold a 3-dimensional base body of mold using weld beads on the basis of form data of the mold. In the method of manufacturing the mold, a base body of mold is formed by laminating welding beads while moving a welding torch attached to a movable frame of an NC machine. A mold having a desired shape is manufactured by performing finishing on the formed base body of mold using a cutting tool or a polishing tool.

CITATION LIST

Patent Documents

[Patent Document 1] Japanese Patent No. 3784539

SUMMARY

However, impurities that cause weld defects such as sputter, slag, fume, or the like, may be generated on surfaces of the welding beads formed through arc welding. When the welding beads are continuously laminated without removing such impurities, molded objects may be formed in a state in which the weld defects remain therein, and reduction in rigidity of finally molded objects may occur. For this reason, it is desired to manufacture molded objects without leaving weld defects therein.

The present disclosure is directed to providing a metal laminating and molding method capable of manufacturing molded objects while minimizing the amount of weld defects remaining therein.

A metal laminating and molding method according to a first aspect of the present disclosure is a metal laminating and molding method of molding a 3-dimensional molded object formed by sequentially laminating a plurality of metal layers, the laminating and molding method includes a unit process including a metal layer laminating process of laminating the metal layer constituted by welding beads formed through arc welding; and a removal process of removing impurities on a surface of the metal layer laminated through the metal layer laminating process, in which the unit process is repeatedly performed, and when the unit process is repeated, the metal layer laminating process is performed again such that a new metal layer is laminated on the surface of the metal layer from which impurities have been removed in the removal process.

According to the above-mentioned configuration, a new metal layer is formed on the metal layer from which impurities have been removed. For this reason, lamination of the new metal layer can be prevented while weld defects remain.

In the metal laminating and molding method according to a second aspect of the present disclosure, in the first aspect, the method may include a temperature measuring process of measuring a temperature on the surface of the metal layer as the uppermost layer laminated in the metal layer laminating process, wherein, when the unit process is repeated, in the case in which the temperature on the surface of the metal layer measured in the temperature measuring process is lower than a predetermined reference temperature, the metal layer laminating process is performed again such that a new metal layer is formed on the surface of the metal layer whose temperature has been measured.

According to the above-mentioned configuration, lamination of a new metal layer on the metal layer on which a temperature is high can be prevented. Accordingly, a decrease in welding quality of a newly formed metal layer can be suppressed. From this, a decrease in strength of the finally manufactured molded product can be further suppressed.

In the metal laminating and molding method according to a third aspect of the present disclosure, in the first or second aspect, the method may include a mechanical machining process of forming a machined surface by machining the metal layer as the uppermost layer laminated in the metal layer laminating process through mechanical machining, wherein, when the unit process is repeated, the metal layer laminating process is performed again such that a new metal layer is formed on the machined surface formed in the mechanical machining process.

According to the above-mentioned configuration, a new metal layer is directly formed on the metal layer in a state in which a concavo-convex portion remains on the surface, so that it is possible to suppressed the shape of the new metal layer from being ruined. From this, accuracy of a shape of a molded product that is finally manufactured can be stabilized.

In the metal laminating and molding method according to a fourth aspect of the present disclosure, in the third aspect, in the mechanical machining process, a concave section having a protruding end portion may be formed such that a bottom surface becomes the machined surface.

According to the above-mentioned configuration, the machined surface is formed to be recessed from the end portion. For this reason, the end portion can serve as an enclosure, and the welding material that is melting can be suppressed flowing down from the side surface. As a result, a shape of the side surface of the molded object upon formation of a new metal layer can be suppressed from being ruined. From this, accuracy of the shape of the molded product that is finally manufactured can be further stabilized.

In the metal laminating and molding method according to a fifth aspect of the present disclosure, in any one of the first to fourth aspects, the method may include a cooling process of cooling the metal layer by supplying a coolant to the surface of the metal layer as the uppermost layer laminated in the metal layer laminating process, wherein, when the unit process is repeated, the metal layer laminating process is performed again such that a new metal layer is formed on the surface of the metal layer cooled in the cooling process.

According to the above-mentioned configuration, the surface of the metal layer is cooled by a coolant and the temperature of the surface is decreased. For this reason, lamination of a new metal layer on the metal layer in a state in which the temperature is high can be prevented. Further, in comparison with the case in which the metal layer is simply left and cooled, the welding waiting time until formation of a new metal layer is started can be reduced.

In the metal laminating and molding method according to a sixth aspect of the present disclosure, in the fifth aspect, in the cooling process, a liquefied coolant may be directly supplied to the surface of the metal layer.

According to the above-mentioned configuration, in comparison with the case in which the surface of the metal layer is indirectly cooled, the surface of the metal layer can be cooled for a short time. Accordingly, the welding waiting time until formation of a new metal layer is started can be further reduced.

In the metal laminating and molding method according to a seventh aspect of the present disclosure, in any one of the first to sixth aspects, the method may include: a form measuring process of measuring a shape of the metal layer as the uppermost layer from which impurities have been removed in the removal process; a form determining process of determining whether the shape of the metal layer as the uppermost layer measured in the form measuring process has deviated from predetermined criteria; and a form adjusting process of adjusting a shape of a new metal layer laminated on the surface of the metal layer whose shape has been measured when it is determined in the form determining process that the shape of the metal layer as the uppermost layer has deviated from the criteria.

According to the above-mentioned configuration, dimensional accuracy of the finally molded object can be improved by reducing an influence of a welding stress or the like.

According to the present disclosure, it is possible to manufacture a molded object without weld defects remaining therein.

DETAILED DESCRIPTION

Hereinafter, an embodiment of the present disclosure will be described with reference to the accompanying drawings.

A metal laminating and molding method S1 forms 3-dimensional molded objects molded by sequentially laminating a plurality of metal layers 1. The molded objects manufactured through the metal laminating and molding method S1 of the embodiment are parts of a turbine or a compressor. More specifically, an impeller or a casing is an exemplary example of the manufactured molded objects.

Figure 1:
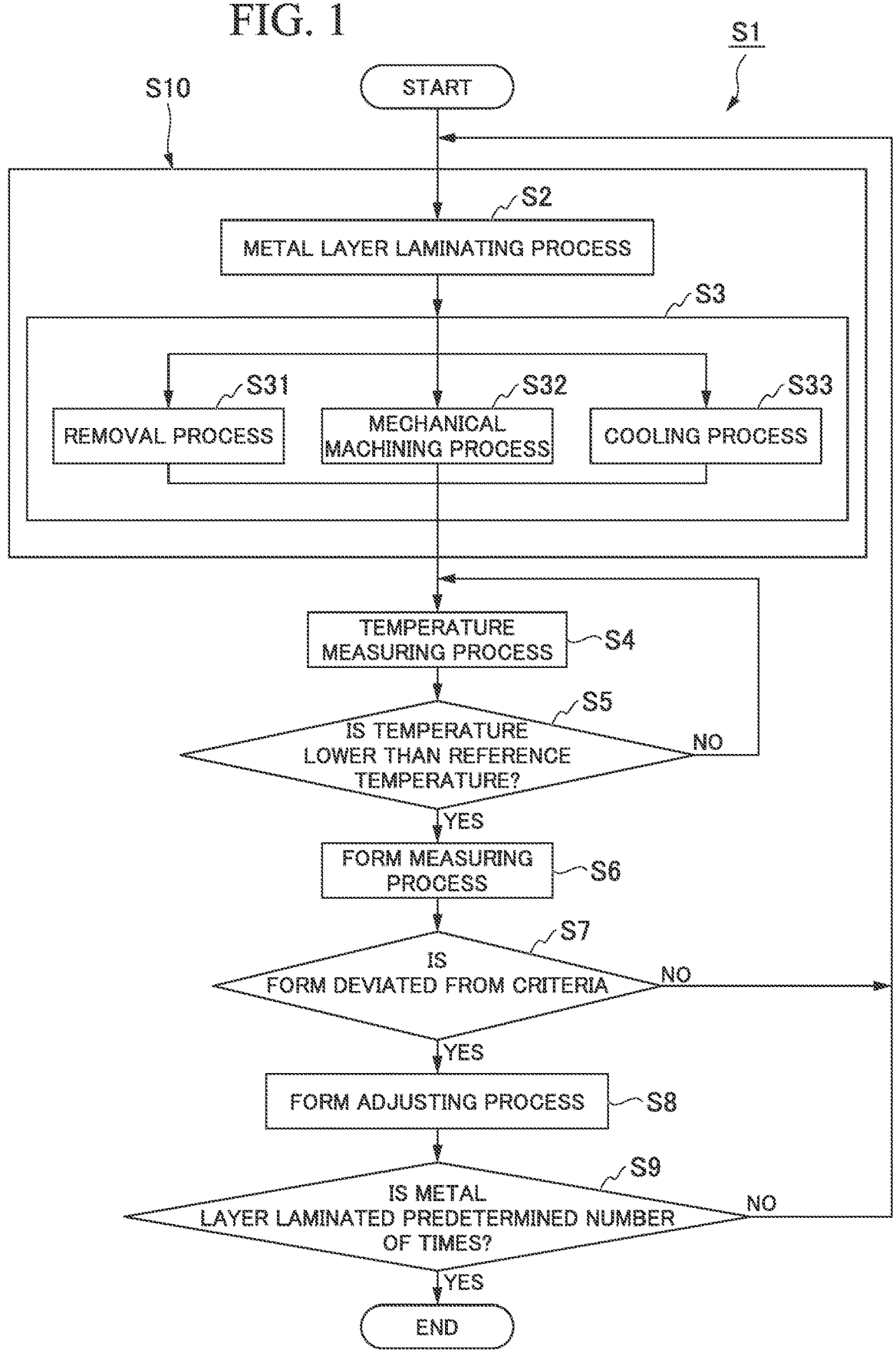
FIG. 1 is a process view showing a metal laminating and molding method according to an embodiment of the present disclosure.

As shown in FIG. 1, the metal laminating and molding method S1 of the embodiment includes a metal layer laminating process S2, a metal layer processing process S3, a temperature measuring process S4, a first determination process S5, a form measuring process S6, a form determining process S7, a form adjusting process S8 and a second determination process S9. The metal laminating and molding method S1 manufactures molded objects by repeatedly performing a unit process S10 including the metal layer laminating process S2 and a removal process S31, which will be described below. In the metal laminating and molding method S1 of the embodiment, the unit process S10 includes the metal layer laminating process S2 and the metal layer processing process S3. In the metal laminating and molding method S1, not only the metal layer laminating process S2 and the metal layer processing process S3 but also the temperature measuring process S4, the first determination process S5, the form measuring process S6, the form determining process S7, the form adjusting process S8 and the second determination process S9 are repeatedly performed. The metal laminating and molding method S1 is performed by an NC machine to which a welding torch or a machining tool is attached.

In the metal layer laminating process S2, the metal layers 1 constituted by welding beads formed through arc welding are laminated. In the metal layer laminating process S2, first, the welding beads are formed on a base through arc welding. The metal layers 1 are constituted by the welding beads. In the metal layer laminating process S2, the welding beads are formed on the basis of form data of molded products, which are previously input. In the metal layer laminating process S2 of the embodiment, one metal layer 1 is configured by continuously forming multi-pass (for example, three passes) welding beads through arc welding. In the metal layer laminating process S2, it is preferable to form the welding beads through high speed welding such as rotary arc welding.

Further, the metal layer 1 is not limited to that, for example, one layer is constituted by multi-pass welding beads as in the embodiment. The metal layer 1 may be constituted as one layer by welding beads of only a single pass.

In the metal layer processing process S3, various types of processes are performed on one layer of the metal layer 1 as the uppermost layer formed through the metal layer laminating process S2. The metal layer processing process S3 of the embodiment includes the removal process S31, a mechanical machining process S32 and a cooling process S33.

In the removal process S31, impurities on a surface of the metal layer 1 as the uppermost layer laminated through the metal layer laminating process S2 are removed. The removal process S31 of the embodiment is performed by attaching a cutting tool or a polishing tool as a machining tool to an NC machine. In the removal process S31, the impurities adhered to the surface and in the vicinity of the metal layer 1 are scraped off and removed. Accordingly, when the unit process S10 is repeated, the metal layer laminating process S2 is performed again such that a new metal layer 1A is laminated on the surface of the metal layer 1 from which the impurities have been removed through the removal process S31.

Here, the impurities are foreign substances generated on the surfaces of the welding beads or in the vicinity thereof that cause weld defects. Specifically, sputter, slag or fume is exemplified as the impurities. The sputter is a metal particle scattered around the welding beads. In addition, the slag is a foreign substance constituted by an intermetallic compound generated from a base metal or a welding material. For example, a glassy material having a low melting point is exemplified as specific slag. In addition, the fume is mineral dust adhered to the periphery of the welding beads. While the fume is a component included in the base metal or the welding material, ratios of components are largely different from original materials.

Figure 2:
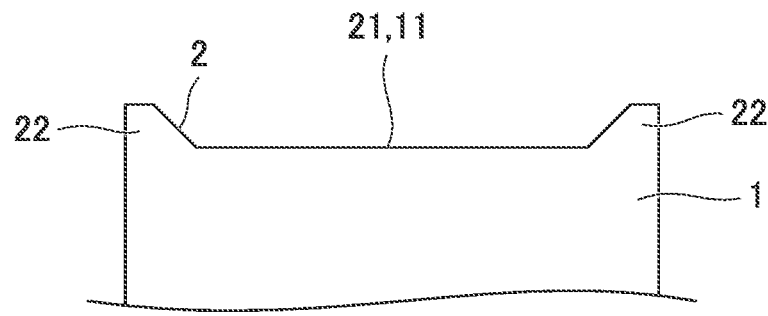
FIG. 2 is a schematic view showing a metal layer after a mechanical machining process according to the present disclosure.

In the mechanical machining process S32, the metal layer 1 as the uppermost layer laminated through the metal layer laminating process S2 is ground through mechanical machining and a machined surface 11 that is smooth is formed. In the mechanical machining process S32 of the embodiment, as shown in FIG. 2, a concave section 2 in which an end portion 22 protrudes is formed such that a bottom surface 21 becomes the machined surface 11. In the mechanical machining process S32, a region deviating from the form data of the molded product is removed. Accordingly, in the mechanical machining process S32, not only the surface of the metal layer 1 but also side surfaces thereof are removed to form smooth surfaces. In the concave section 2, the depression amount is smaller than the thickness of a single pass of the welding bead. Specifically, when the thickness of the single pass of the welding bead is 2.0 mm to 3.0 mm, the concave section 2 is formed to a depression amount of about 0.5 mm to 1.0 mm. In addition, although it is difficult for the metal in the molten state to be spilled out of the concave section 2 upon arc welding as a width of the end portion 22 is increased, the width is likely to deviate from the form data of the molded products. For this reason, the width of the end portion 22 is preferably set so as not to deviate from the form data of the molded products. In addition, in the mechanical machining process S32, the metal layer 1 is removed such that the bottom surface 21 of the concave section 2 becomes planar. Accordingly, when the unit process S10 is repeated, the metal layer laminating process S2 is performed again such that a new metal layer 1A is formed on the bottom surface 21 formed through the mechanical machining process S32.

As shown in FIG. 1, the mechanical machining process S32 of the embodiment is performed by an NC machine simultaneously with the removal process S31. That is, since the metal layer 1 is removed by the NC machine, impurities are removed while the concave section 2 is formed. Accordingly, the mechanical machining process S32 of the embodiment is included in the unit process S10 and performed repeatedly together with the metal layer laminating process S2 or the removal process S31.

Further, the machined surface 11 formed through the mechanical machining process S32 may be a smooth surface, but is not limited to a planar plane. Accordingly, the machined surface 11 may be formed as a smoothly curved surface according to a shape of the manufactured molded product.

In the cooling process S33, a coolant is supplied to the surface of the metal layer 1 as the uppermost layer laminated through the metal layer laminating process S2 and the metal layer 1 is cooled. In the cooling process S33 of the embodiment, a liquefied coolant is directly supplied to the surface of the metal layer 1. In the cooling process S33, cutting oil or air is supplied as the coolant. Accordingly, when the unit process S10 is repeated, the metal layer laminating process S2 is performed again such that a new metal layer 1A is formed on the surface of the metal layer 1 cooled through the cooling process S33.

The cooling process S33 of the embodiment is performed by an NC machine simultaneously with the removal process S31 and the mechanical machining process S32. That is, the metal layer 1 is cooled using cutting oil or air as a coolant supplied when the metal layer 1 is removed by the NC machine. Accordingly, the cooling process S33 of the embodiment is included in the unit process S10 and performed repeatedly and simultaneously with the metal layer laminating process S2 or the removal process S3.

In the temperature measuring process S4, a temperature on the surface of the metal layer 1 as the uppermost layer laminated through the metal layer laminating process S2 is measured. The temperature measuring process S4 of the embodiment is performed after the unit process S10. Accordingly, in the temperature measuring process S4, a temperature of the machined surface 11, which is the surface of the metal layer 1 in which the concave section 2 is formed, is measured while the cutting oil or air is being applied. In the temperature measuring process S4, temperature information on the surface of the metal layer 1 is acquired without contacting the metal layer 1, using a thermo-sensor or a non-contact thermometer. Since the temperature information after acquisition is sent to a control device (not shown), the temperature information is displayed on a monitor or is used for machining by the NC machine.

In the first determination process S5, it is determined whether the temperature on the surface of the metal layer 1 measured through the temperature measuring process S4 is below a predetermined reference temperature. Here, the reference temperature is a temperature at which welding beads can be newly formed without causing a decrease in welding quality on the metal layer 1, and a temperature at which the coolant supplied to the surface of the metal layer 1 can be regarded as being evaporated. Accordingly, the reference temperature is, for example, about 100° C. In the first determination process S5, when it is determined that the temperature measured in the temperature measuring process S4 is below the reference temperature, the form measuring process S6 is performed. In addition, in the first determination process S5, when it is determined that the temperature measured in the temperature measuring process S4 exceeds the reference temperature, the temperature measuring process S4 is performed again after a predetermined amount of time has elapsed.

In the form measuring process S6, a shape of the metal layer 1 as the uppermost layer from which impurities have been removed in the removal process S31 is measured. In the form measuring process S6, a shape of the metal layer as the uppermost layer that is sufficiently cooled by the cooling process S33 is measured. The form measuring process S6 of the embodiment is performed after the first determination process S5. In the form measuring process S6, a shape of the metal layer 1 is measured using a 3-dimensional measurement instrument in a contact or non-contact manner. Specifically, when the shape of the metal layer 1 is measured in a non-contact manner, for example, a laser beam, a pattern beam or an arc sensor is used. In addition, when the shape of the metal layer 1 is measured in a contact manner, for example, a touch sensor is used.

In the form determining process S7, it is determined whether the shape of the metal layer 1 as the uppermost layer measured in the form measuring process S6 has deviated from predetermined criteria. Here, the predetermined criteria are determined according to a dimension that is allowable with respect to a shape of a finally molded object. For example, as the predetermined criteria, a value obtained by considering a certain dimensional tolerance to the form data of the molded products is exemplified. When it is determined that the shape of the metal layer 1 has deviated from the criteria in the form determining process S7, the form adjusting process S8 is performed. In addition, when it is determined that the shape of the metal layer 1 has not deviated from the criteria in the form determining process S7, the metal layer laminating process S2 is performed again.

In the form adjusting process S8, when it is determined that the shape of the metal layer 1 as the uppermost layer has deviated from the criteria in the form determining process S7, a shape of a new metal layer 1A laminated on the surface of the metal layer 1 whose shape has been measured is adjusted. In the form adjusting process S8 of the embodiment, since a condition for forming a new metal layer 1A is adjusted, a shape of the new metal layer 1A is adjusted. A condition for forming the new metal layer 1A to be adjusted in the form adjusting process S8 is preferably, for example, a condition by which a welding stress that exerts an influence on the shape of the finally molded object can be eliminated. Specifically, as the condition by which the welding stress is eliminated, for example, a cooling condition (a temperature, a time, or the like) in the cooling process S33 is exemplified. In addition, as another condition, for example, a position of the welding torch when the welding beads are formed in the metal layer laminating process S2, addition of post machining, or the like, is an exemplary example.

In the second determination process S9, it is determined whether the metal layers 1 are laminated a predetermined number of times. Here, the predetermined number is the number of the metal layers required for completion of the shape of the finally molded object. The predetermined number is determined on the basis of the form data of the molded products. In the second determination process S9, when it is determined that the metal layers 1 are not laminated a predetermined number of times, the unit process S10 is performed again. That is, in the second determination process S9, when it is determined that the metal layers 1 are not laminated a predetermined number of times, the metal layer laminating process S2 is performed again. Accordingly, when the unit process S10 is repeated, in the case in which the temperature on the surface of the metal layer 1 measured in the temperature measuring process S4 is lower than the reference temperature, the metal layer laminating process S2 is performed again such that a new metal layer 1A is formed on the surface of the metal layer 1 whose temperature has been measured. In addition, in the second determination process S9, when it is determined that the metal layers 1 are laminated a predetermined number of times, the entire process is terminated.

Figure 3:
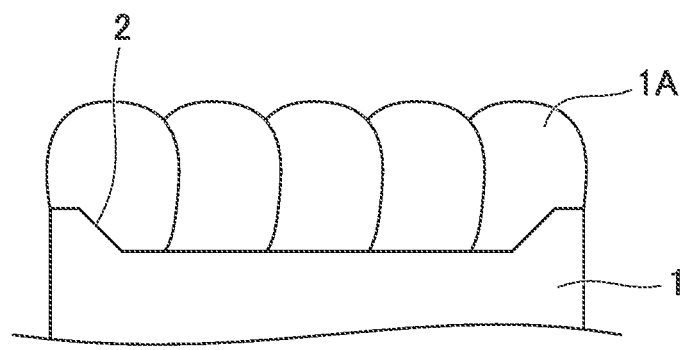
FIG. 3 is a schematic view showing a state in which a metal layer laminating process is performed on a bottom surface of a concave section after a second determination process according to the present disclosure.

Accordingly, in the metal layer laminating process S2 after the second determination process S9, as shown in FIG. 3, a new metal layer 1A is formed on the bottom surface 21 of the metal layer 1 whose temperature has been measured. Here, in the embodiment, the metal layer 1 on which the new metal layer 1A is formed is the metal layer 1 from which impurities have been removed in the removal process S31, and the metal layer 1 cooled in the cooling process S33. Then, the surface of the metal layer 1 is the machined surface 11 that becomes the bottom surface 21 as the surface of the metal layer 1 is removed to form the concave section 2 in the mechanical machining process S32.

According to the above-mentioned metal laminating and molding method S1, impurities on the surface of the metal layer 1 as the uppermost layer are removed in the removal process S31. After that, a new metal layer 1A is formed on the metal layer 1 from which impurities have been removed. For this reason, lamination of the new metal layer 1A can be prevented while the impurities remain on the surface of the metal layer 1 or in the vicinity thereof. Accordingly, lamination of the new metal layer 1A can be prevented while weld defects remain. Accordingly, it is possible to manufacture molded objects while minimizing an amount of weld defects remaining therein.

In addition, since the surface of the metal layer 1 as the uppermost layer is removed to form the machined surface 11 in the mechanical machining process S32, the new metal layer 1A is formed on the machined surface 11. For this reason, the new metal layer 1A is directly formed on the metal layer 1 in a state in which a concavo-convex portion remains on the surface, and a shape of the new metal layer 1A can be suppressed from being ruined. From this, accuracy of the shape of the molded product that is finally manufactured can be stabilized.

In particular, not only the surface of the metal layer 1 is simply formed as the smooth machined surface 11 but also the concave section 2 having the machined surface 11 as the bottom surface 21 is formed such that the end portion 22 protrudes. In the end portion 22 of the metal layer 1, a welding material before being melted and solidified upon arc welding is likely to flow down. However, the end portion 22 higher than the bottom surface 21 can serve as an enclosure, and the welding material that is melting can be suppressed flowing down from the side surface. As a result, the shape of the side surface of the molded object can be suppressed from being ruined upon formation of the new metal layer 1A. Accordingly, accuracy of the shape of the molded product that is finally manufactured can be further stabilized.

In addition, the surface of the metal layer 1 as the uppermost layer is cooled by cutting oil. For this reason, the machined surface 11 of the metal layer 1 is cooled by the cutting oil and the temperature is lowered. When the metal layer 1 is laminated, welding quality may deteriorate when a new metal layer 1A is laminated on the metal layer 1 in a state in which the temperature is too high. However, since the machined surface of the metal layer 1 is cooled by the cutting oil, lamination of the new metal layer 1A on the metal layer 1 in a state in which the temperature is high can be prevented. Further, in comparison with the case in which the metal layer 1 is simply left and cooled, a welding waiting time until formation of a new metal layer 1A is started can be reduced.

In particular, the cutting oil is directly supplied to the machined surface 11 before the new metal layer 1A is laminated. For this reason, in comparison with the case in which the machined surface 11 of the metal layer 1 is indirectly cooled as when the side surfaces of the metal layer 1 are cooled or the like, the machined surface 11 of the metal layer 1 can be cooled in a short time. Accordingly, a welding waiting time until formation of a new metal layer 1A is started can be further reduced.

In addition, since the removal process S31, the mechanical machining process S32 and the cooling process S33 are simultaneously performed using the NC machine, a manufacturing time until manufacture of the finally molded object is completed can be further reduced.

In addition, since the temperature of the machined surface 11 is measured in the temperature measuring process S4, lamination of the new metal layer 1A on the metal layer 1 on which the temperature is high can be reliably prevented. Accordingly, a decrease in welding quality of the new metal layer 1A can be reliably suppressed. From this, a decrease in strength of the molded product that is finally manufactured can be further suppressed.

In addition, since a shape of the metal layer 1 as the uppermost layer is measured in the form measuring process S6, it is possible to grasp how much the shape of the molded object in the middle of manufacturing has deviated from the form data due to the welding stress. Then, since the shape of the new metal layer 1A is adjusted according to the measured shape of the metal layer 1, the molded object can be manufactured while correcting the deviation due to an influence of the welding stress. Accordingly, dimensional accuracy of the finally molded object can be improved.

The embodiments of the disclosure have been described above in detail with reference to the drawings, but the respective components of the respective embodiments, the combinations thereof, and the like are exemplary. The disclosure may have an addition, omission, and replacement of components, and various other modifications without departing from the scope of the disclosure. Further, the disclosure is limited only by the claims and without being limited by the embodiments.

For example, as in the embodiment, the removal process S31, the mechanical machining process S32 or the cooling process S33 is not limited to being simultaneously performed. The removal process S31, the mechanical machining process S32 and the cooling process S33 may be separately performed or any one process may not be performed. Accordingly, the mechanical machining process S32 or the cooling process S33 may be separately performed after the unit process S10.

In addition, in the removal process S31, machining by the NC machine is not limited to using the cutting tool or the polishing tool. In the removal process S31, it is only necessary that impurities are removed, and for example, an operator may manually perform the removal using a grinder, brushing, chipping or TIG-attached dressing.

In addition, in the metal laminating and molding method S1, the temperature measuring process S4, the first determination process S5 and the second determination process S9 are not limited to being repeatedly performed as in the embodiment. The temperature measuring process S4, the first determination process S5 and the second determination process S9 may be finally performed only once or may be intermittently performed.

In addition, the temperature measuring process S4 or the first determination process S5 is not limited to be performed after the unit process S10. The temperature measuring process S4 or the first determination process S5 may be included in the unit process S10 or may be performed between the metal layer laminating process S2 and the removal process S31 (the metal layer processing process S3).

In addition, the form measuring process S6, the form determining process S7 and the form adjusting process S8 are not limited to be necessarily performed in the metal laminating and molding method S1 as in the embodiment. For example, the form measuring process S6, the form determining process S7 and the form adjusting process S8 may not be performed in the metal laminating and molding method S1. In addition, the form measuring process S6, the form determining process S7 and the form adjusting process S8 may be performed once whenever the unit process S10 is performed a plurality of times when an influence of the welding stress is small.

EXPLANATION OF REFERENCES

S1 Metal laminating and molding method
S2 Metal layer laminating process
S3 Metal layer processing process
S31 Removal process
S32 Mechanical machining process
S33 Cooling process
S4 Temperature measuring process
S5 First determination process
S6 Form measuring process
S7 Form determining process
S8 Form adjusting process
S9 Second determination process
S10 Unit process
1 Metal layer
2 Concave section
21 Bottom surface
22 End portion
11 Machined surface
1A New metal layer

What is claimed is:

1. A metal laminating and molding method of molding a 3-dimensional molded object formed by sequentially laminating a plurality of metal layers, the metal laminating and molding method comprising:
   a unit process including
      a metal layer laminating process of laminating the metal layer constituted by welding beads formed through arc welding; and
      a removal process of removing impurities adhered to a surface of the metal layer laminated through the metal layer laminating process, wherein
   the unit process is repeatedly performed,
   when the unit process is repeated, the metal layer laminating process is performed again such that a new metal layer is laminated on the surface of the metal layer from which impurities have been removed in the removal process,
   the metal laminating and molding method further includes a mechanical machining process of forming a machined surface by machining the metal layer as the uppermost layer laminated in the metal layer laminating process through mechanical machining,
   when the unit process is repeated, the metal layer laminating process is performed again such that a new metal layer is formed on the machined surface formed in the mechanical machining process, and
   in the mechanical machining process, a concave section, having a protruding end portion that protrudes from the machined surface and that is formed in an end portion of the machined surface, is formed such that a bottom surface becomes the machined surface.

2. The metal laminating and molding method according to claim 1, comprising a temperature measuring process of measuring a temperature on the surface of the metal layer as the uppermost layer laminated in the metal layer laminating process,
   wherein, when the unit process is repeated, in the case in which the temperature on the surface of the metal layer measured in the temperature measuring process is lower than a predetermined reference temperature, the metal layer laminating process is performed again such that a new metal layer is formed on the surface of the metal layer whose temperature has been measured.

3. The metal laminating and molding method according to claim 2, comprising a cooling process of cooling the metal layer by supplying a coolant to the surface of the metal layer as the uppermost layer laminated in the metal layer laminating process,
   wherein, when the unit process is repeated, the metal layer laminating process is performed again such that a new metal layer is formed on the surface of the metal layer cooled in the cooling process.

4. The metal laminating and molding method according to claim 3, wherein, in the cooling process, a liquefied coolant is directly supplied to the surface of the metal layer.

5. The metal laminating and molding method according to claim 1, comprising a cooling process of cooling the metal layer by supplying a coolant to the surface of the metal layer as the uppermost layer laminated in the metal layer laminating process, wherein, when the unit process is repeated, the metal layer laminating process is performed again such that a new metal layer is formed on the surface of the metal layer cooled in the cooling process.

6. The metal laminating and molding method according to claim 5, wherein, in the cooling process, a liquefied coolant is directly supplied to the surface of the metal layer.

7. The metal laminating and molding method according to claim 1, comprising:

a form measuring process of measuring a shape of the metal layer as the uppermost layer from which impurities have been removed in the removal process;

a form determining process of determining whether the shape of the metal layer as the uppermost layer measured in the form measuring process has deviated from predetermined criteria; and a form adjusting process of adjusting a shape of a new metal layer laminated on the surface of the metal layer whose shape has been measured when it is determined in the form determining process that the shape of the metal layer as the uppermost layer has deviated from the criteria.

* * * * *

UNITED STATES PATENT AND TRADEMARK OFFICE
CERTIFICATE OF CORRECTION

| | | |
|---|---|---|
| PATENT NO. | : 10,994,355 B2 | Page 1 of 1 |
| APPLICATION NO. | : 16/139157 | |
| DATED | : May 4, 2021 | |
| INVENTOR(S) | : Yasunori Sakai et al. | |

It is certified that error appears in the above-identified patent and that said Letters Patent is hereby corrected as shown below:

On the Title Page

Item (72) The inventors add:

Kazuhiro Ishibashi:
c/o Yamazaki Mazak Corporation
1-131 Takeda, Oguchi-cho, Niwa-gun,
Aichi, Japan 480-0197

Yasuyuki Tanaka:
c/o Yamazaki Mazak Corporation
1-131 Takeda, Oguchi-cho, Niwa-gun,
Aichi, Japan 480-0197

Atsushi Suzuki:
c/o Yamazaki Mazak Corporation
1-131 Takeda, Oguchi-cho, Niwa-gun,
Aichi, Japan 480-0197

Seigo Ouchi:
c/o Yamazaki Mazak Corporation
1-131 Takeda, Oguchi-cho, Niwa-gun,
Aichi, Japan 480-0197

Signed and Sealed this
Seventh Day of January, 2025

Derrick Brent
*Acting Director of the United States Patent and Trademark Office*